United States Patent
Michitsuji et al.

(10) Patent No.: US 8,002,478 B2
(45) Date of Patent: Aug. 23, 2011

(54) OPTICAL SUB-ASSEMBLY WITH GLASS MEMBER PHYSICALLY CONTACT WITH EXTERNAL FIBER

(75) Inventors: Yasunori Michitsuji, Osaka (JP); Hiromi Nakanishi, Yokohama (JP); Kenji Hirayama, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 26 days.

(21) Appl. No.: 12/546,822

(22) Filed: Aug. 25, 2009

(65) Prior Publication Data
US 2010/0054666 A1 Mar. 4, 2010

(30) Foreign Application Priority Data
Aug. 26, 2008 (JP) .................................. 2008-217080

(51) Int. Cl.
*G02B 6/42* (2006.01)
(52) U.S. Cl. ................................ 385/92; 385/93; 385/94
(58) Field of Classification Search ............... 385/92–94
See application file for complete search history.

(56) References Cited

U.S. PATENT DOCUMENTS

| 7,198,415 | B2 | 4/2007 | Yamasaki et al. |
| 2004/0141699 | A1* | 7/2004 | Sato ................................ 385/93 |
| 2007/0212002 | A1* | 9/2007 | Sato ................................ 385/92 |

FOREIGN PATENT DOCUMENTS

| JP | 4-57381 | 2/1992 |
| JP | 10-332988 | 12/1998 |
| JP | 2006-276374 | 10/2006 |

* cited by examiner

*Primary Examiner* — Michelle R Connelly Cushwa
(74) *Attorney, Agent, or Firm* — Smith, Gambrell & Russell, LLP

(57) ABSTRACT

An optical receptacle that enhances the optical coupling tolerance is disclosed. The optical receptacle of the invention provides, in stead of the coupling fiber installed in a conventional optical receptacle, a glass member with a diameter substantially equal to the diameter of the external fiber. The glass member, which is held by the support, provides a convex surface that abuts against the top of the external ferrule and another surface inclined with the optical axis to prevent the light reflected thereat from returning the optical device. The glass member has a substantially homogeneous distribution in the refractive index thereof; accordingly, the fluctuation in the optical coupling with the external ferrule may be reduced.

17 Claims, 12 Drawing Sheets

FIG. 10C
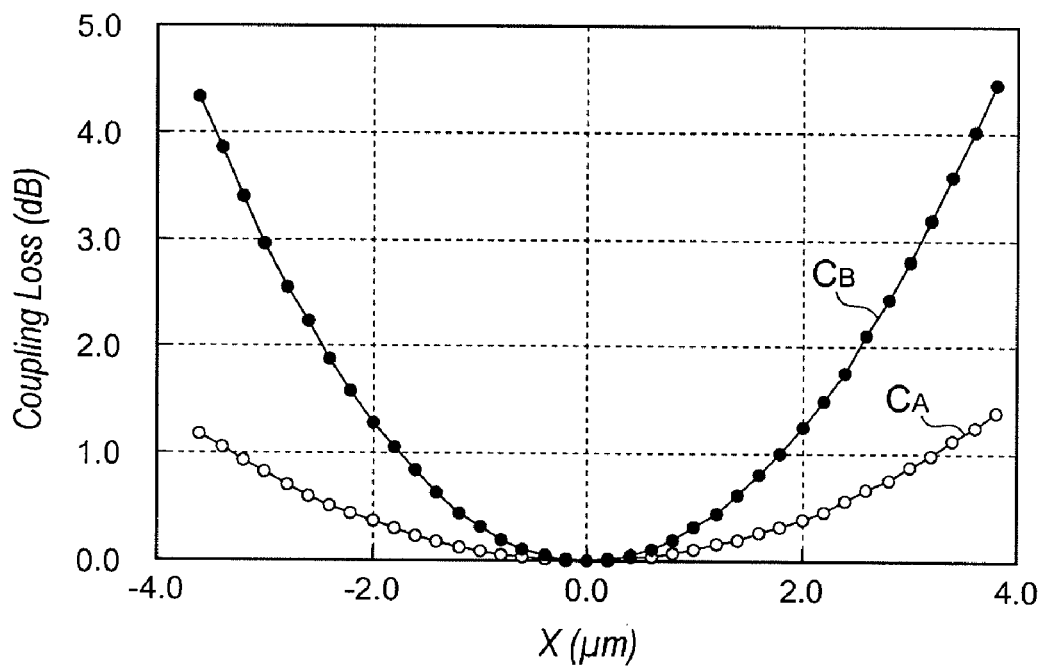
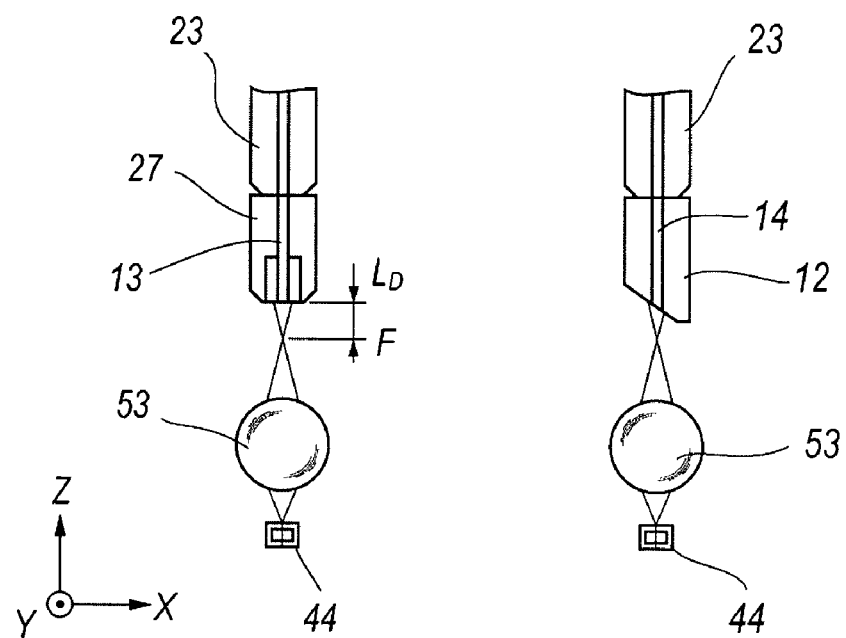
FIG. 10A  FIG. 10B

OPTICAL SUB-ASSEMBLY WITH GLASS MEMBER PHYSICALLY CONTACT WITH EXTERNAL FIBER

BACKGROUND OF THE INVENTION

1. Field of the Invention

The present invention relates to an optical sub-assembly.

2. Related Background Arts

A Japanese Patent Application published as JP-H10-332988A has disclosed an optical receptacle that receives the ferrule with an optical fiber in a center portion thereof. This ferrule is inserted into the sleeve of the optical receptacle to make a physical contact against the stub held in the other side of the sleeve. The stub provides the coupling fiber in a center portion thereof. Thus, the external fiber may optically couple with the optical device through the coupling fiber.

Another Japanese Patent Application published as JP-2006-276374 has disclosed another type of the optical receptacle, where the optical receptacle provides the stub and the stub holder. The stub provides a transparent medium in a center portion thereof. The transparent medium comes in physically contact with the tip of the optical fiber to couple the optical device with the external fiber. In the optical receptacle, a diameter of the transparent medium is larger than the diameter of the external fiber.

One of the inventors of this application has disclosed an optical receptacle in the U.S. Pat. No. 7,198,415, in which the optical receptacle includes a sleeve, a stub, a bush and a shell. The stub provides a bore accompanied with two openings along the optical axis and filled with a filler substance made of silica glass, which is transparent for the light. One of the openings facing the external ferrule has a diameter substantially same as that of the external fiber, while, the other opening is widely opened to the optical device.

In the optical receptacle described above, the optical coupling between the external ferrule and the optical device may be carried out by coming the external ferrule in physically contact to the top of the coupling fiber or the transparent medium, that is, the optical coupling may be achieved by arranging three optical components; the ferrule, the coupling fiber or the transparent medium and the optical device, are arranged in series along the optical axis. However, the optical coupling characteristic between them sometimes widely varies after the iteration of the ferrule inserting into or extracting from the optical receptacle. Or, when the ferrule is inserted into and rigidly secured by the optical receptacle and the external fiber connected to the ferrule is wiggled or the ferrule is forced to the direction perpendicular to the optical axis; the optical coupling characteristic between the ferrule and the optical device degrades. The reason of the degradation in the optical coupling is considered to be less tolerance of the optical coupling between the external fiber and the coupling fiber.

Moreover, when the conventional optical receptacle provides the stub with the coupling fiber in the center thereof, a substantial length of the coupling fiber is necessary to get a successful performance for the insertion/extraction of the ferrule. However, a longer coupling fiber restricts the small-sized optical receptacle. When the coupling fiber or the transparent medium set in the center of the stub is tightly held by the outer shell of the stub and the stub is press-fitted into the end of the sleeve or the bush to hold the stub rigidly, the stress caused by the press-fitting substantially affects the coupling fiber or the transparent medium.

SUMMARY OF THE INVENTION

An aspect of the present invention relates to an optical sub-assembly that optically couples with an external fiber providing a ferrule in an end thereof. The optical sub-assembly comprises an optical receptacle and an optical device. The optical device installs at least a semiconductor optical device to be optically coupled with the external fiber through the optical receptacle. A feature of the present invention is that the optical receptacle comprises a glass member, a holder, a sleeve and a shell. The glass member, which comes in physically contact with the external fiber, has substantially homogeneous distribution of the refractive index and a diameter substantially equal to the diameter of the external fiber. The holder provides a first bore and a second bore connected to each other. The first bore has a diameter slightly larger than a diameter of the glass member. The sleeve receives the ferrule in one side and the holder in the other side thereof to come the ferrule in physically contact to the holder in the sleeve. The shell, which includes a support portion and a joint portion, holds the holder with the glass member and the sleeve in the supper portion thereof; while, it receives the optical device in the joint portion. In the optical sub-assembly according to the present invention, the second bore of the holder has a diameter greater than the diameter of the first bore such that a gap is formed between the glass member and the inner wall of the second bore.

The holder may provide the first portion that holds the glass member and the second portion that is press-fitted into a first bore formed in the support portion of the shell such that the first portion of the holder protrudes from the first bore of the support portion. Thus, the first portion may be press-fitted into the other side of the sleeve. Because only the second portion of the holder is press-fitted into the bore of the support portion, the stress caused by this press-fitting may be suppressed to affect the glass member.

The support portion may further provide the second bore connected to the first bore so as forming a step therebetween. The holder in the second portion thereof may be press-fitted into the first bore such that an end of the holder that faces the optical device abuts against the step, which may optically align the holder along the optical axis of the optical receptacle.

The holder of the present invention may further provide a third bore connected to the second bore. The third bore has a diameter larger than that of the second bore of the holder. The end of the glass member facing the optical device may position within the third bore of the holder.

Another aspect of the present invention relates to an optical receptacle that optically couples the optical fiber secured in a center of the ferrule being inserted in the optical receptacle with an optical device assembled with the optical receptacle. The optical receptacle of the invention comprises a glass member, a holder, a sleeve and a support member. The glass member has substantially homogeneous distribution of the refractive index thereof and a diameter substantially equal to the diameter of the optical fiber. This glass member comes in physically contact with the optical fiber in the sleeve. The holder has the first and second bores connected to each other. The first bore holds the glass member with resin. The sleeve receives the ferrule in one side and the holder in the other side. The support member holds the sleeve by press-fitting in the other side thereof into the bore provided in the support member. A feature of the optical receptacle according to the present invention is that the second bore of the holder has a diameter greater than the diameter of the first bore of the holder such that a gap may be formed between the glass member and the inner wall of the second bore.

BRIEF DESCRIPTION OF DRAWINGS

The foregoing and other purposes, aspects and advantages will be better understood from the following detailed description of a preferred embodiment of the invention with reference to the drawings, in which:

FIG. 10A schematically illustrates the optical arrangement according to the present optical sub-assembly, FIG. 10B schematically illustrates the optical arrangement in the conventional optical sub-assembly, and FIG. 10C compares the optical coupling loss obtained in the optical sub-assembly of the invention with the coupling loss in the conventional optical sub-assembly;

DESCRIPTION OF PREFERRED EMBODIMENTS

Next, several preferred embodiments according to the present invention will be described as referring to accompanying drawings. In the description of the drawings, the same elements will be referred by the same symbols or the same numerals without overlapping explanations.

Figure 1:
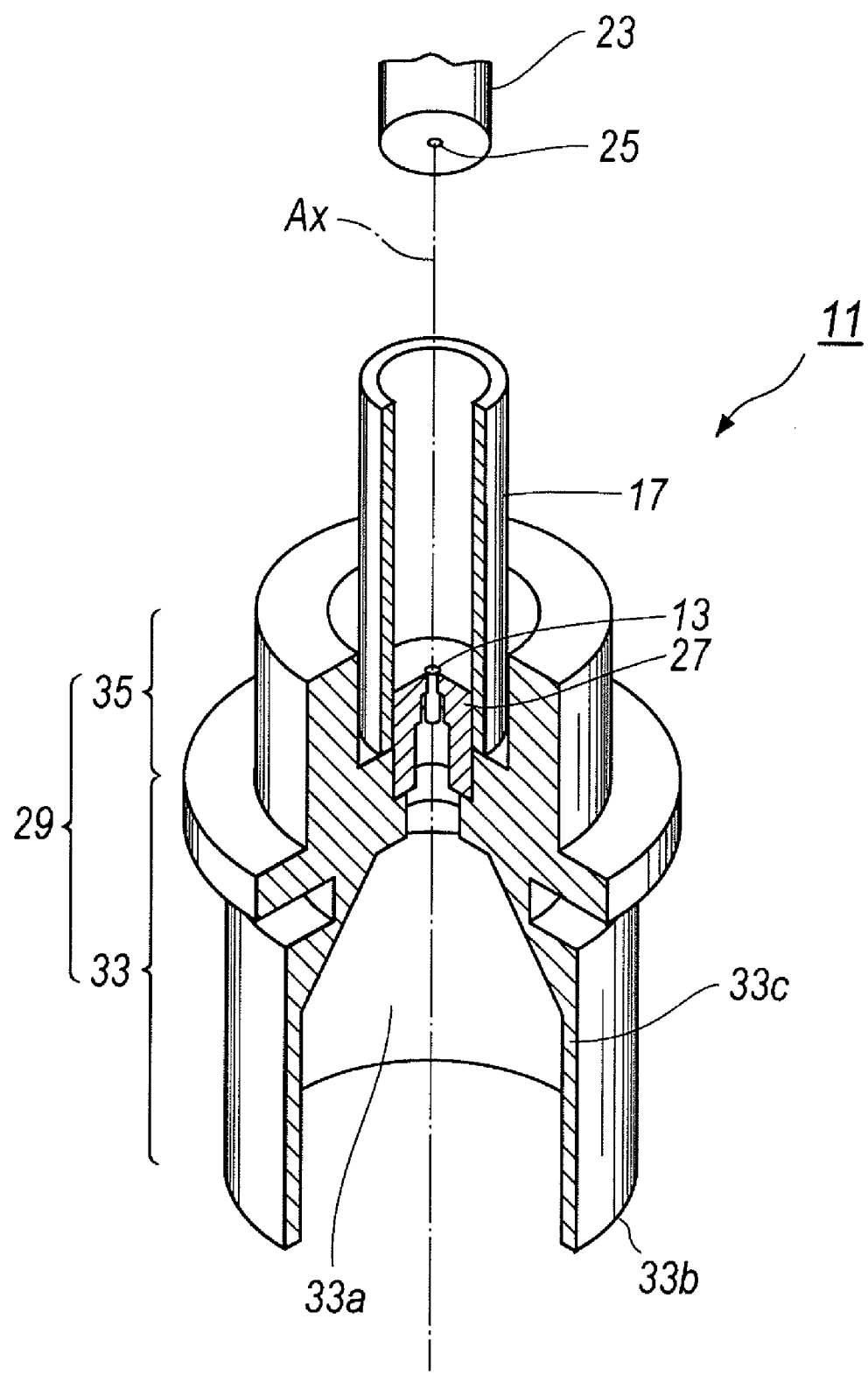
FIG. 1 is a perspective view of the optical receptacle, a portion of which is broken to view the inside thereof, according to an embodiment of the present invention.
Figure 2:
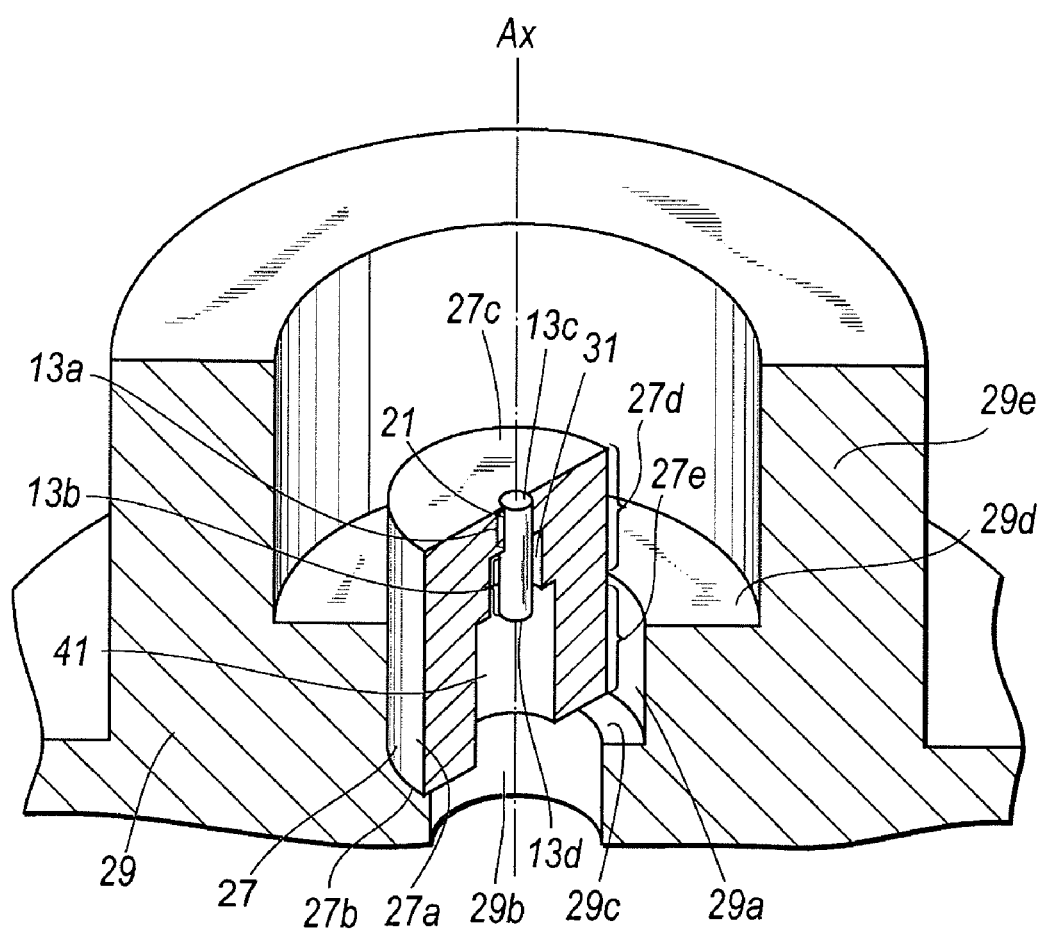
FIG. 2 illustrates the support and the glass member assembled within the optical receptacle shown in FIG. 1.
Figure 3:
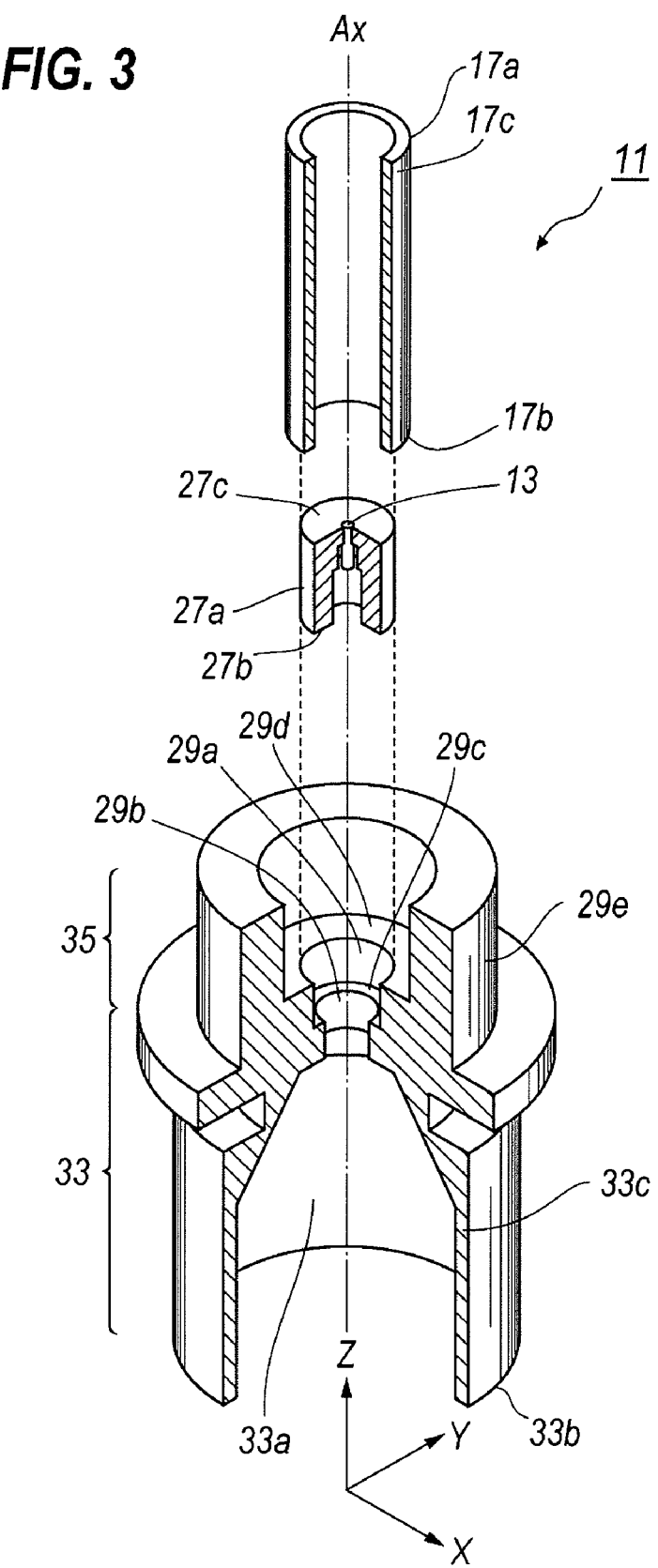
FIG. 3 is an exploded view of the optical receptacle shown in FIG. 1.

FIG. 1 is a partially cut perspective view of an optical receptacle 11 assembled with an optical device 39; FIG. 2 is a magnified view of a holder 27 and a glass member 13 set in a center portion of the holder 27; and FIG. 3 is an exploded view of the optical receptacle 11.

Figure 4:
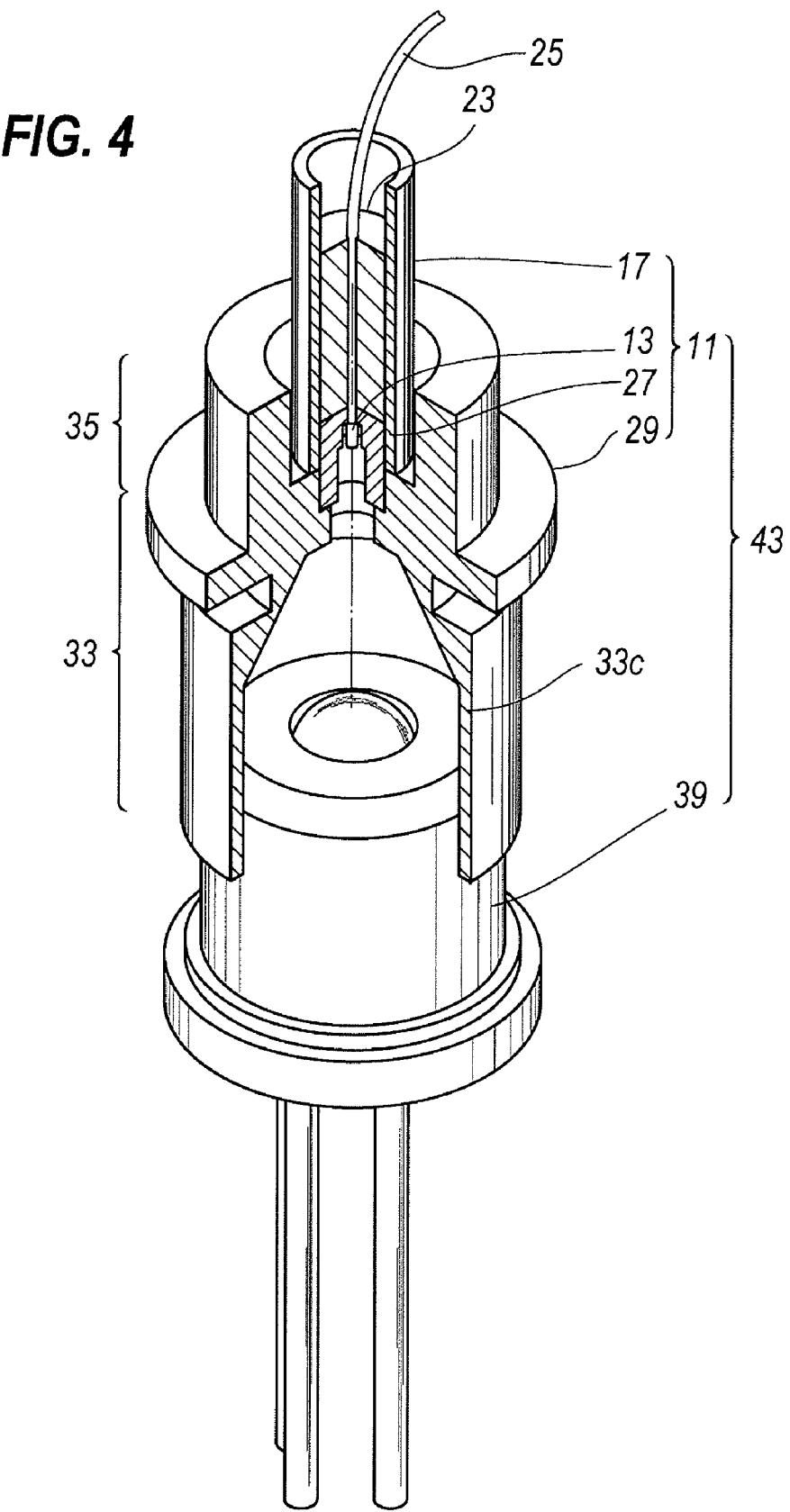
FIG. 4 is a perspective view of an optical sub-assembly that provides the optical receptacle shown in FIG. 1 and the optical device.

The optical receptacle 11 comprises the columnar glass member 13, a holder 27, a sleeve 17 and a shell 29. The sleeve 17 sets the holder 27 in one end thereof; while, receiving the external ferrule 23 in the other end. The external ferrule 23 is attached in a tip end of the external fiber 25 that optically couples with the optical device 39, which is illustrated in FIG. 4, through the optical receptacle 11. That is, the sleeve 17, which is a cylindrical member, comprises an end 17a, from which the ferrule 23 is inserted, the other end 17b that receives a portion of the holder 27, and a wall 17c extending from the end 17a to the other end 17b along the optical axis Ax to form the bore. The tip of the ferrule 23 comes in contact with the tip of the glass member 13 within this bore. The sleeve 17 may be a precision sleeve, which is sometimes called as a rigid sleeve, or a split sleeve, which is called as an elastic sleeve. The sleeve 17 may be made of ceramics such as zirconia; metal such as phosphor bronze and stainless steel; and plastics, or the like.

The glass member 13 transmits light along the direction Ax. When the optical receptacle 11 is assembled with a transmitter optical device, the light emitted from the transmitter optical device propagates within the glass member 13; while, the light propagating in the glass member 13 enters the receiver optical device when the optical receptacle 11 is assembled with the receiver optical device. The glass member 13 includes, along the direction Ax, first and second columnar portions, 13a and 13b, as illustrated in FIG. 2; and two ends 13c and 13d opposite to each other. The end 13c comes in physical contact with the end of the ferrule 23; while, the other end 13d optically couples with the optical device 39. The holder 27 provides a bore 21 extending along the direction Ax, into which the glass member 13 is inserted and fixed, as illustrated in FIG. 2.

The glass member 13 does not provide a substantial distribution in the refractive index in order to confine the light propagating in the member 13. Such a distribution is generally observed in an ordinary optical fiber. That is, the glass member 13 does not provide, along the axial direction, a core region with larger refractive index and a cladding region with relatively lower refractive index. Therefore, the misalignment caused between the ferrule 23 and the glass member 13 does not strongly affect the optical coupling efficiency between them. The arrangement of the glass member 13 according to the present embodiment may enhance the optical coupling tolerance between the ferrule 23 and the glass member 13. On the other hand, the light coming from the optical device 39 couples with the other end 13d of the glass member, not couples directly with the optical fiber 25 in the ferrule 23. Because the glass member 13 does not provide the distribution of the refractive index to confine the light, the coupling tolerance between the optical device 39 and the glass member 13 may be further enhanced. Moreover, the glass member 13 without any distribution in the refractive index makes the position of the bore 21 formed in the holder 27 insensitive, which may also enhance the coupling tolerance with respect to the ferrule 23 and the optical device 39.

The optical fiber often causes a lot of transmission modes, such as the cladding mode and the core mode, for the light propagating therein. In a conventional optical receptacle that provides a coupling fiber in the stub not the glass member 13, the light with the cladding mode temporarily invades in the core region when the optical ferrule 23 is inserted into or extracted from the sleeve 17, which maybe considered as a cause to vary the optical coupling efficiency and is often called as the wiggle failure. The glass member 13 according to the present embodiment, because it has substantially homogeneous distribution in the refractive index without forming any core and cladding regions, neither the cladding mode nor the core mode are generated for the light propagation, which may suppress the fluctuation in the optical power at the insertion/extraction of the ferrule 23.

Moreover, the holder 27 holds the glass member 13 only in the first columnar portion 13a by the bore 21 extending along the axis Ax. This arrangement makes it possible, even when the holder 27 is prolonged to enhance the reliability of the insertion/extraction of the ferrule 23, that the glass member 13 may be independent of the expansion of the holder 27. Specifically, a conventional arrangement of the stub and the coupling fiber, where the coupling fiber is necessary to extend from the end to the other end of the stub, is inevitable to set the length of the stub at least about 3 mm to secure the coupling efficiency with the ferrule, which makes it hard to downsize the optical receptacle. On the other hand, the glass member 13 according to the present embodiment may be free from the length of the holder 27, which may down-size the optical receptacle 11.

The end surface 27c of the holder 27 faces the end of ferrule 23; while, the other end 27b provides an opening of the bore 41 within which the end 13d of the glass member 13 positions. The holder 27 may be fit into a bore 29a of the shell 29. This bore 29a not only guides the holder 27 but has a function to align the holder 27 along the direction Ax.

Inserting the holder 27 into the bore 29a of the shell 29, the bores, 21 to 41 of the holder 27 may be automatically aligned with respect to the axis Ax. The arrangement of the optical receptacle 11 according to the present embodiment distinguishes the shell 29 from the holder 27; accordingly, only the shell 29 is necessary to provide a function to couple the ferrule 23 with the optical device 39 mechanically; while, only the holder 27 is necessary to provide a function to secure and hold the glass member 13. That is, only the holder 27 must provide the mechanical preciseness to hold the glass member 13.

Because the holder 27 has a cylindrical outer shape whose center coincides with the axis Ax, and the bore 29a of the shell 29 into which the holder 27 is fit and the bore 21 in the holder 27 into which the glass member 13 is inserted also have the center coinciding with the axis Ax and the members has no corners in the peripheral thereof; the physical dimensions, in particular, the relative tolerance between members may be easily secured. This arrangement may enhance not only the positional accuracy of the bore 21 in the holder 27 but the accuracy with respect to the shell 29.

The glass member 13, as already described, may have the columnar shape with a constant diameter. Specifically, the glass member 13 may be a glass wire whose diameter ranges from 80 to 126 μm. Preferably, the diameter of the glass member 13 is substantially same with that of the optical fiber, generally 125 μm with tolerance around 1 μm; that is, the diameter of the glass member 13 is preferably from 124 to 126 μm. Such a glass member 13 is easily produced by the ordinary process for the optical fiber. The length of the glass member 13 is preferably shorter than that of the holder 27 but longer than the length of the bore 21. The glass member may have a length about 500 μm, while, the length of the bore 21 may be about 300 μm.

Various equipments used in the assembly of the conventional optical receptacle that provides the coupling fiber in the stub instead of the glass member 13 will be applicable of the assembly of the optical receptacle 11 according to the present embodiment. The glass member 13 is preferable to show the refractive index substantially equal to that of the silica glass, namely, about 1.46 to reduce the reflection at the interface between the external fiber 25 secured in the ferrule 23 and the glass member 13. Specifically, the refractive index of the glass member 13 may be 1.462±0.045 to show the Fresnel reflection below 0.1%. The glass member 13, as described above, may be made of silica glass, while, the holder 27 may be made of ceramics, such as zirconia or alumina; or metal. The end surface 27c of the holder 27 is preferably shaped in convex accompanied with the end of the glass member 13 by the polish so as to come in physically contact with the end of the external fiver 25 securely. The diameter of the holder 27 may be 2.5 mm for the optical connectors with the FC standard or the SC standard, while it maybe 1.25 mm for the connectors with the LC standard or the MU standard. The radius of the curvature of the convex surface 27c may be 20 to 25 mm, which shows substantially no lens function. Further specifically, the discrepancy between the optical axis Ax of the ferrule 23 and the top of the convex surface 27c maybe smaller than 50 μm, and the discrepancy between the top of the glass member 13 and the top of the convex surface 27c of the holder 27 may be from −0.05 to +0.1 μm.

The other end 13d of the glass member 13 may be inclined with respect to the axis Ax by an angle of about 6° to prevent the light reflected by this end surface 13d from entering the optical device 39 again. The inclined angle maybe 4 to 10°. Because the holder 27 supports a portion of the glass member 13, the other end 13d of the glass member 13 is independent of the holder 27. Therefore, only the glass member 13 is inclined in the end 13d thereof without inclining the end of the holder 27. For the manufacturing of the optical receptacle 11, in particular, the method of assembling the glass member 13 with the holder 27, first cleaving the glass member 13 at the surface inclined by the angle mentioned above with respect to the axis Ax, second inserting the cleaved glass member 13 into the bore 21 of the holder 27 so as to position the inclined surface within the bore 41, and finally polishing the top surface 27c with the inserted glass member 13 in convex, then the optical receptacle 11 is completed.

The arrangement where the diameter of the glass member 13 substantially equal to the diameter of the external fiber 25 brings various advantages: the glass member 13 maybe formed by a process substantially same as those for the optical fiber; the holder 27 may be formed so as to apply an ordinary optical fiber; the polishing of the end surface 27c of the holder 27 with the glass member 13 may be carried out so as to polish the end of the ferrule 23; the cleaving of the glass member 13 to form the inclined surface 13d may be carried out by the apparatus ordinarily applied to the processing of the optical fiber.

Moreover, because the glass member 13 shows substantially homogeneous distribution in the refractive index thereof along the radial direction, the light may propagate therein homogeneously without causing any core modes and cladding modes. Thus, the positional accuracy of the bore 21 of the holder 27 and that of the glass member 13 with respect to the holder 27 may be relaxed while both members, the holder 27 and the glass member 13, may be formed accompanied with the dimensional accuracy of the optical fiber.

The holder 27 will be further specifically described. The holder 27 includes the first portion 27d and the second portion 27e along the axis Ax. Only the second portion 27e is supported by the shell 29, that is, only the second portion 27e is fit into the bore 29a of the shell 29; while, the first portion 27d protrudes from the bottom 29d of the shell 29 so as to set the first portion 27d within the sleeve 17, which enables the ferrule 23 to come in physical contact with the surface 27c of the holder 27 within the sleeve 17. The first portion 27d includes the bore 21, while, the second portion 27e provides the other bore 41. The length of the bore 21 may be shorter than the length of the first portion 27d.

The end 13d of the glass member 13, which is inclined to the axis Ax, is involved in the second portion 27e thereof. The holder 27 provides, in addition to the bore 21, another bore 31 connected the former bore 21 and along with the axis Ax. The cross section of the other bore 31 is larger than that of the first bore 21. The second columnar portion 13b positions within the second bore 31 with a gap to the inner wall of the bore 31. Because the inner diameter of the second bore 31 is larger than the outer diameter of the second columnar portion 13b of the glass member 13, the light coming from the optical device 39 is not blocked by the holder 27, or the light outgoing from the end surface 13d of the glass member 13 is not blocked by the holder 27.

When the holder 27 sets the glass member 13 in the first bore 21 thereof by resin or adhesive, a surplus resin or adhesive may be accumulated in the gap between the holder 27 and the second columnar portion 13b in the second bore 31. However, because the second columnar portion 13b protrudes from the second bore 21, the inclined surface 13d may be free from the surplus resin. The resin may be a type of thermo-curable epoxy resin.

The holder 27 shown in FIG. 2 as one exemplary embodiment may further provide a third bore 41 connected to the second bore 31 along the axis Ax. The diameter of the third bore 41 is greater than that of the second bore 31. Setting the diameter of the third bore 41, the lay trace of the light coming from the optical device 39 to the end surface 13d of the glass member 13 or the light outgoing to the optical device 39 from the end surface 13d may not be blocked by the holder 27. Gradual enlargement of the bore size, 21 to 41, enables the holder 27 to have the thicker side walls.

The shell 29 provides the first bore 29a and the second bore 29b connected to each other along the axis Ax. These bores, 29a and 29b, where the diameter of the first bore 29a is greater than that of the second bore 29b, forms a step 29c between them. The first bore 29a receives the holder 27 but the end surface 27b thereof does not come in directly contact with the step 29c. That is, the holder 27 is optically aligned with the optical device 39 along the axis Ax such that the end 27b thereof is apart from the step 29c. The holder 27 maybe press-fitted into the first bore 29a of the shell 29. Because the holder 27 is press-fitted only in the second portion 27e thereof into the first bore 29a but the first portion 27d is free from the press-fitting, and the first portion 27d supports the glass member 13 only in the bore 21; the stress introduced in the second portion 27e by the press-fitting scarcely reaches the glass member 13.

The shell 29 provides a support portion 35, which provides a mechanism to support the holder 27 and the sleeve 17; and the joint portion 33 connected to the support portion 35. The support portion 35 provides a side wall 29e to guide and to protect the sleeve 17. In the arrangement shown in FIGS. 1 and 3, the sleeve 17 receives the first portion 27d of the holder 27. The sleeve 17 may optically couple the glass member 13 secured in the holder 27 with the external fiber 25 in the ferrule 23.

Because a gap is provided between the sleeve 17 and the inner wall 29g of the support portion 35, even the press-fitting of the holder 27 into the sleeve 17 causes swells, the gap between the sleeve 17 and the inner wall 29g may provide a room for such swells. The alignment of the sleeve 17 along the axis Ax may be carried out by abutting the end 17b against the step 29d of the shell 29.

The joint portion 33, as illustrated in FIGS. 3 and 4, joins the optical receptacle 11 with the optical device 39. The joint portion 33 provides a bore 33a defined by the side wall 33c to receive the optical device 39. The bore 33a is connected to the bores, 29a and 29b, where the former bore 29a receives the holder 27 while the latter 29b passes the light; thus, the optical device 39 in the bore 33a may optically couples with the external fiber 25 through the glass member 13. The optical device 39 may slide on the inner surface of the wall 33b, which may optically align the optical device along the axis Ax.

Figure 5:
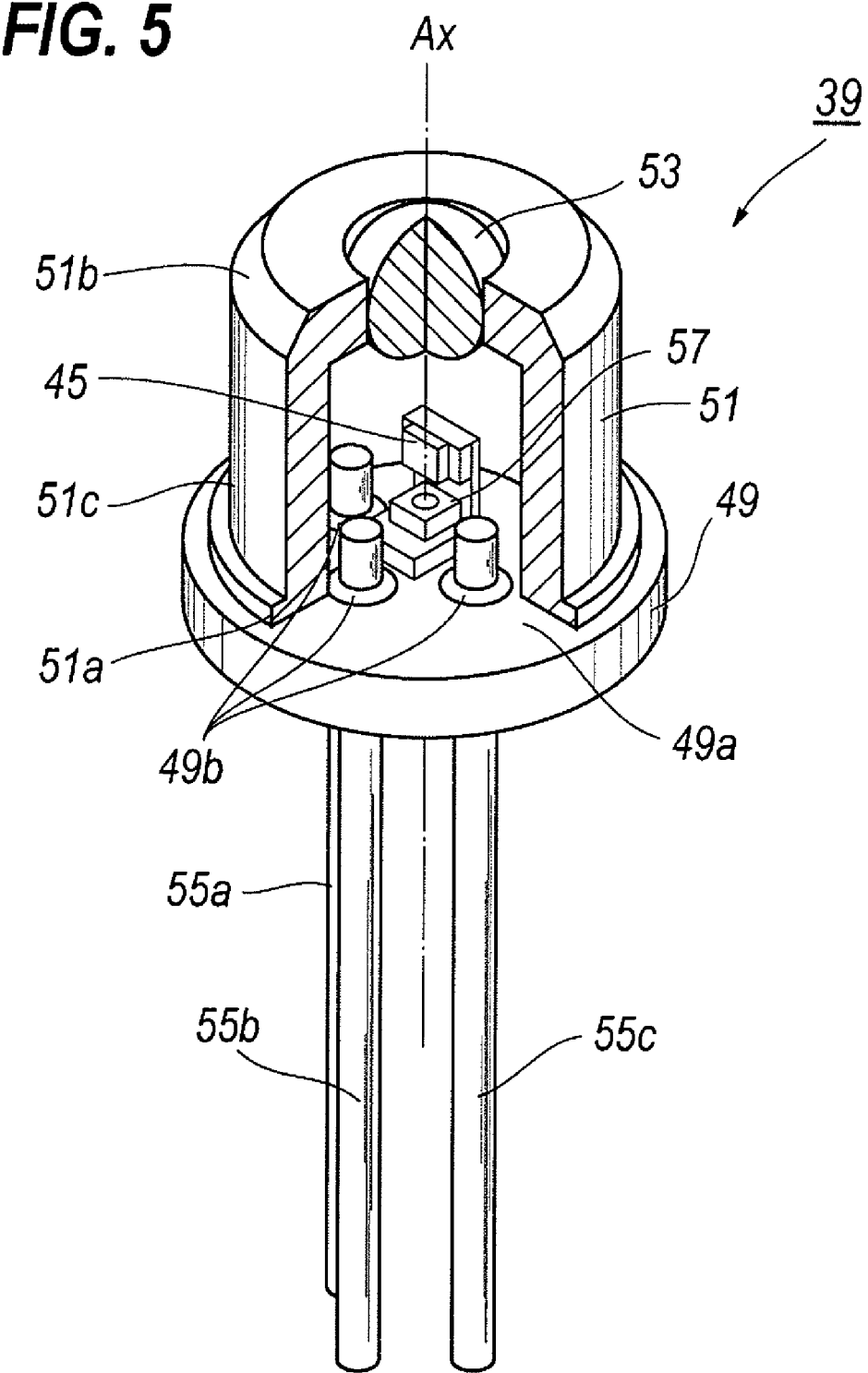
FIG. 5 illustrates the optical device shown FIG. 4, a portion of the cap is broken to view the inside thereof.

The optical device 39 may be optically aligned to the optical receptacle 11, as described above. The optical device 39, as illustrated in FIG. 5, installs a semiconductor optical device 45 therein; thus, the semiconductor optical device 45 may optically couple with the external fiber 25 through the glass member 13 and the window 53 provided in the optical device 39. In the embodiment shown in FIGS. 1 to 5, because the end surface 13d in the side of the second columnar portion 13b of the glass member 13 is apart from the inner walls of respective bores, 31 and 41, that is, the gap exists between the glass member 13 and the holder 27 so as to surround the glass member 13, the total reflection of the light coming from the optical device 39 at the end surface of the glass member 13 and the holder 27 may be reduced by the existence of the gap.

FIG. 5 illustrates the inside of the optical device 39. The optical device 39 includes the stem 49 and the cap 51. The cap 51 has the bottom flange 51a, the ceiling 51b, and a side 51c. The ceiling 51b supports the window 53, typically an optical lens; while the side 51c may be used to align this optical device 39 with the optical fiber 25 along the axis Ax by sliding the side 51c on in the wall 33b of the bore 33a. The bottom 51a of the cap 51 is fixed to the stem 49 by, for instance, the resistance welding. While, the stem 49 with a disk shape has a surface 49a on which the semiconductor optical device 45 is mounted and the bottom 51a of the cap 51 is fixed. Thus, the stem 49 and the cap 51 form a cavity in which the semiconductor optical device 45 is installed. The stem 49 also supports a plurality of lead pins, 55a to 55c. That is, the stem 49 provides a plurality of holes 49b extending along the axis Ax, through which the lead pins, 55a to 55c, pass as they are held by seal glass to seal the cavity hermetically.

In a case where the semiconductor optical device 45 is a type of semiconductor laser diode, which is called as a transmitter optical sub-assembly (TOSA) combined with the optical receptacle 11, the light emitted from this device 45 enters the end 13d of the glass member 13 passing through the lens 53 of the cap 51. The optical device 39 may further install a light-receiving device 57 to monitor the optical power of the light emitted from the light-emitting device 45. On the other hand, when the optical device 45 installs a semiconductor light-receiving device such as photodiode, which is called as a receiver optical sub-assembly (ROSA) combined with the optical receptacle 11; the photodiode 45 receives the light provided from the external fiber 25 through the glass member 13 and the lens 53.

Figure 6:
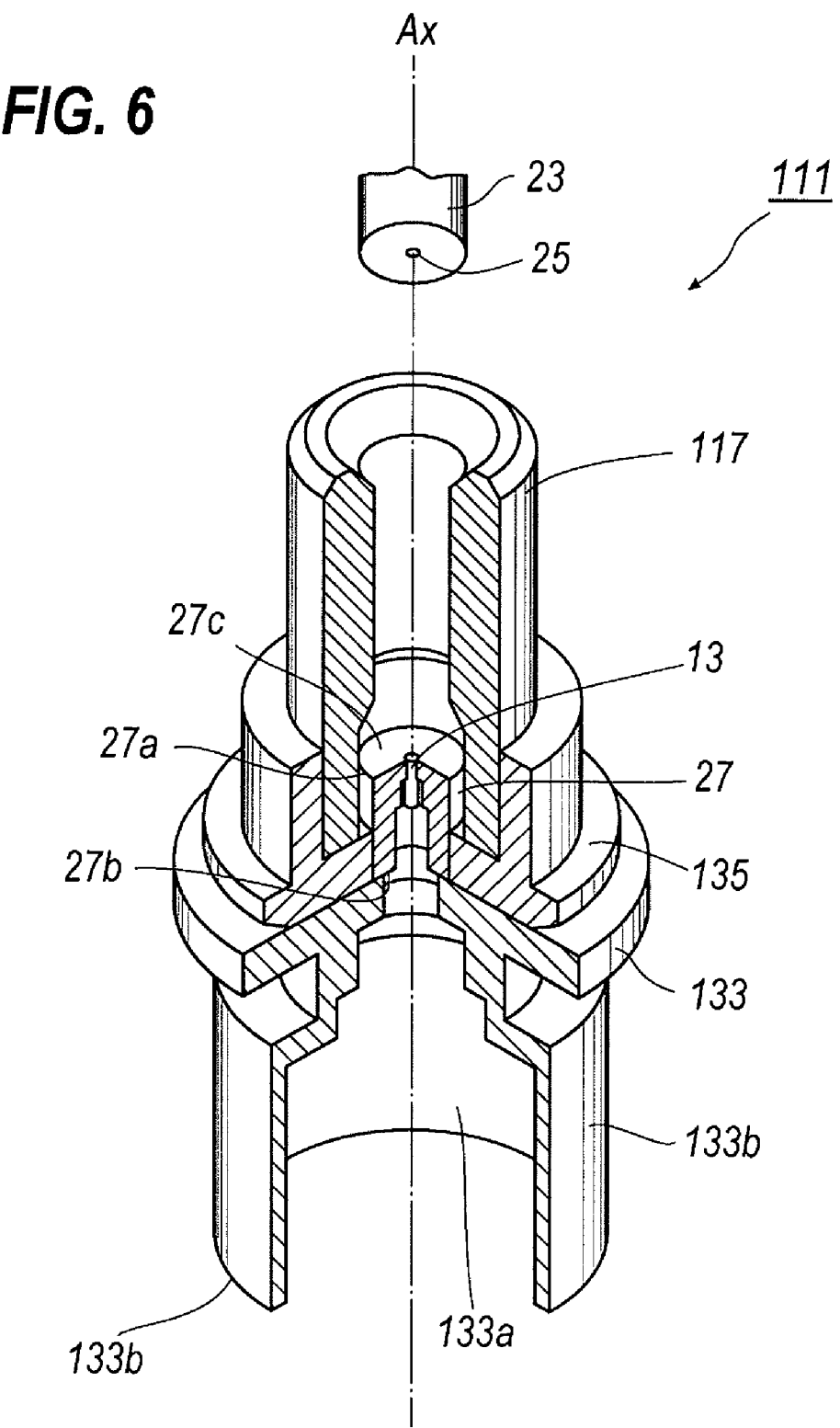
FIG. 6 illustrates an optical receptacle according to another embodiment of the present invention.
Figure 7:
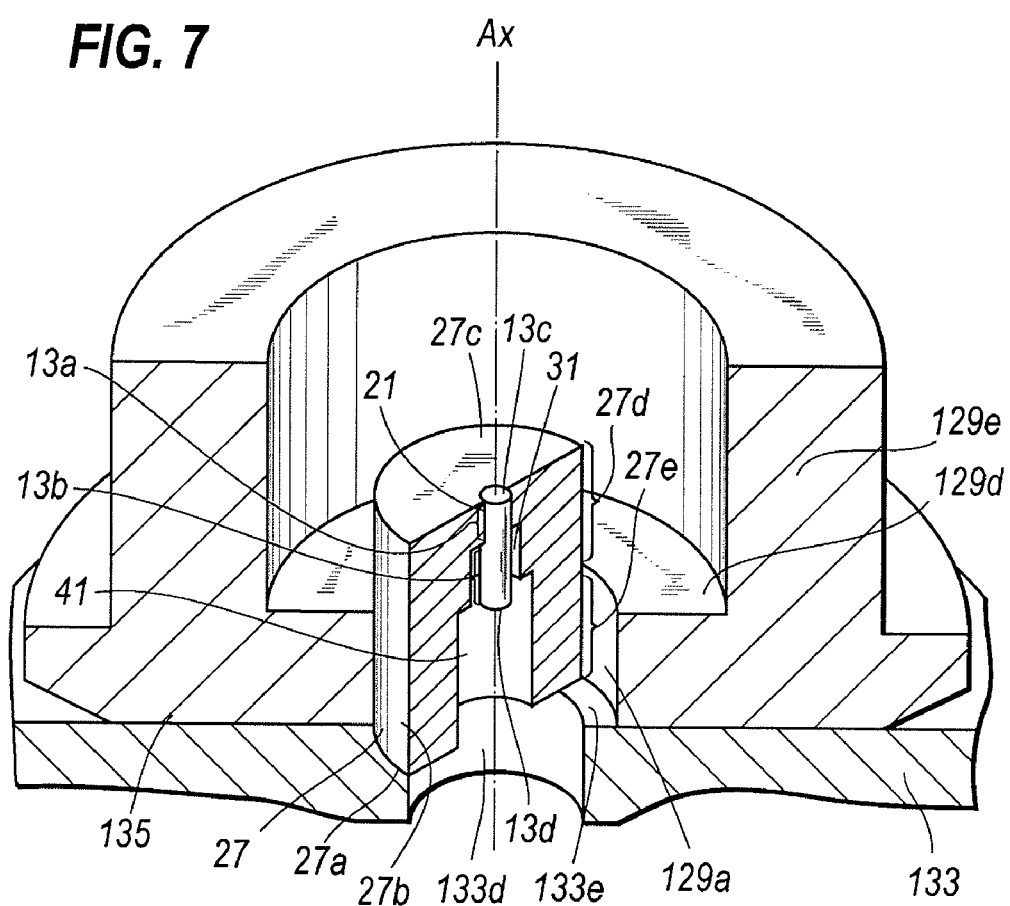
FIG. 7 shows the sleeve member, the support and the glass member provided in the optical receptacle shown in FIG. 6.
Figure 8:
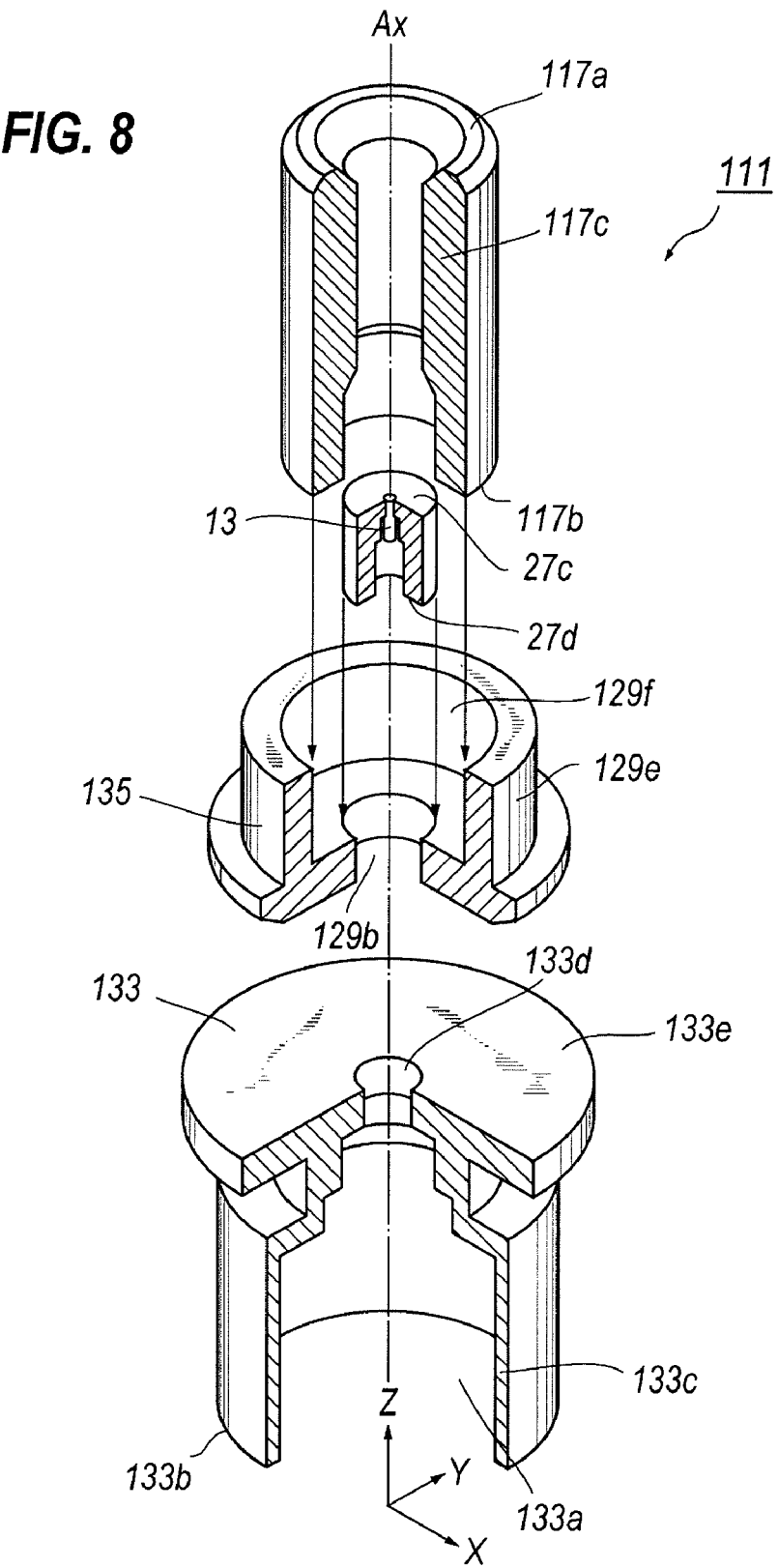
FIG. 8 is an exploded view of the optical receptacle shown in FIG. 6.
Figure 9:
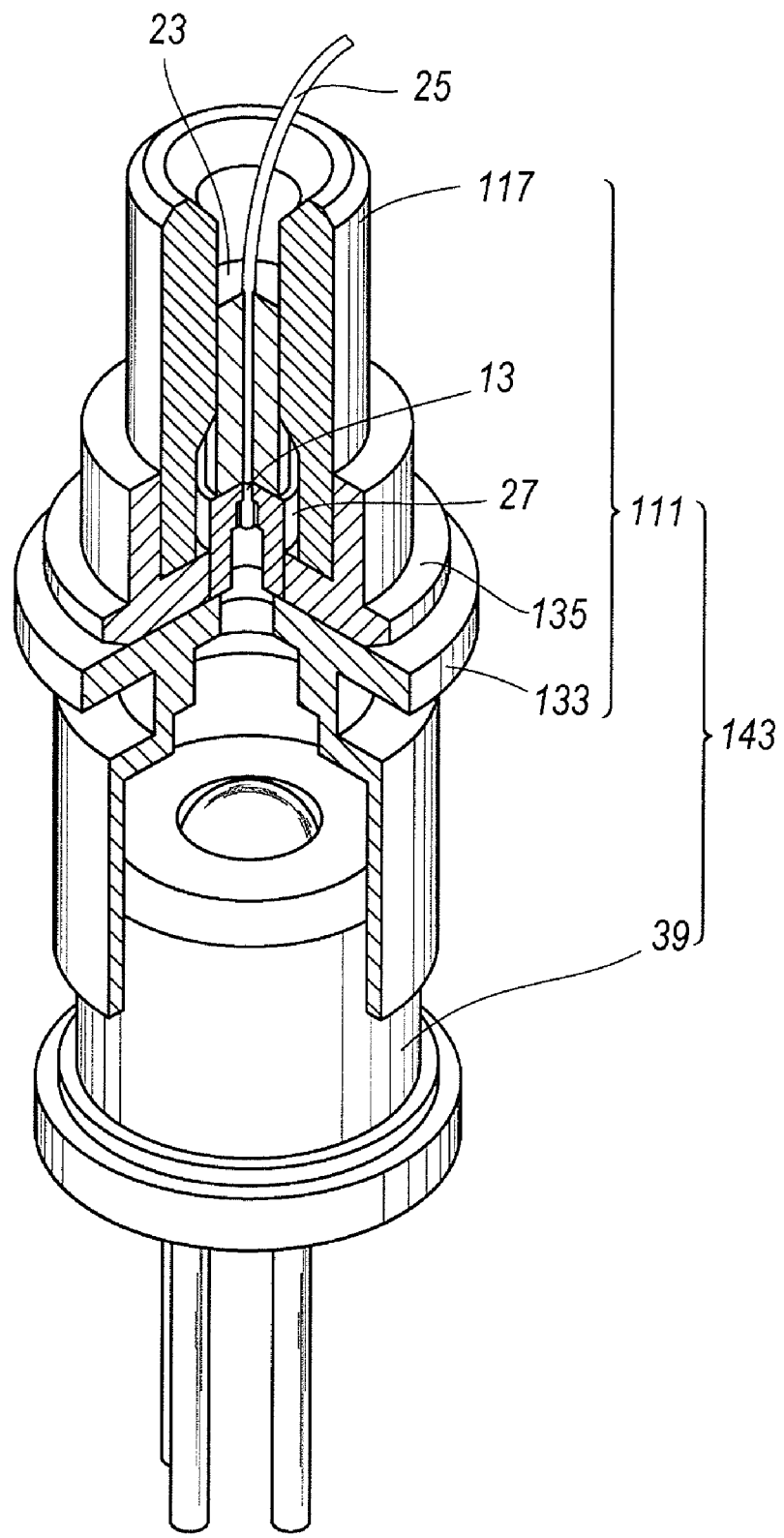
FIG. 9 shows an optical sub-assembly that provides the optical receptacle shown in FIG. 6.

FIG. 6 illustrates a modified arrangement of the optical receptacle 111 according to another embodiment of the invention; FIG. 7 magnifies a portion where the glass member 13 is held by the holder 27 and the holder 27 is held by the support member 135; FIG. 8 is an exploded view of the optical receptacle 111; and FIG. 9 illustrates the optical sub-assembly 143 that provides the optical device 39 assembled with the optical receptacle 111.

The optical receptacle 111 comprises the columnar glass member 13, the support member 135, the joint member 133 and the sleeve 117. The optical receptacle 111 of the present embodiment has an arrangement different from those 11 of the former embodiment in that the joint member 133 has a body independent of the support member 135, that is, the shell 129 only includes the support member 135 to hold the sleeve 117. The support member 135 corresponds to the support portion 35, while, the joint member corresponds to the joint portion in the former embodiment. The sleeve 117 provides two portions, one of which has a relatively thicker wall and receives the external ferrule 23; while, the other has a thinner wall and receives the holder 27.

As illustrated in FIG. 8, the support member 135 of the present embodiment may provide a bore 129f formed by a wall 129e extending along the axis Ax and the bottom 129d to hold the sleeve 117.

The support member 135 further provides the opening 129a connected to the bore 129f. The opening 129a extends in parallel to the axis Ax from the bottom 129d to the outer surface of the support member 135 that faces the joint member 133. The bore 129a receives and supports the holder 27.

The support member 135 is assembled with the joint member 133 such that the end surface of the support member 135 is mounted on the end surface 133e of the joint member 133 as illustrated in FIG. 8. The holder 27 is press-fitted into the bore 129a in the second portion 27e thereof and is optically aligned along the axis Ax within a range where the end 27d of the holder 27 is apart from the end surface 133e of the joint member 133.

The holder 27 is press-fitted into the bore 129a and securely held by the support member 135. The ferrule 23 comes in physically contact with the end of the glass member 13, which may determine the end position of the external fiber 25.

The sleeve 117 may cover the holder 27 in the portion where the wall thereof is relatively thinner, and may be press-fitted into the bore 129f of the support member 135. That is, the sleeve 117 is press-fitted within the bore 129f until the end 117b thereof abuts against the bottom 129d. Although the press-fitting of the sleeve 117 into the support member 135 may cause some deformations in the sleeve 117, a gap between the sleeve 117 and the holder 27 may absorb such deformations.

The joint member 133, which is independent of the support member 135 in this embodiment, provides a mechanism to assemble and to align the optical device 39 optically. The joint member 133 provides the bore 133d connected to the bore 129a of the support member 135 and the end surface 133e extending perpendicular to the axis Ax. The support member 135 that includes, in addition to the sleeve 117, the holder 27 with the glass member, is optically aligned in the XY-plane perpendicular to the axis Ax by sliding them on the surface 133e. The optical device 39 received in the bore 133a may optically couple with the glass member 13 held in the holder 27 because the bore 133d is connected with the bore 129a.

As illustrated in FIG. 9, the optical sub-assembly 143 of the present embodiment provides the optical receptacle 111 and the optical device 39. Similar to the former embodiment of the optical sub-assembly 43, the present optical sub-assembly 143 has the glass member 13 whose side in the second columnar portion 13b is apart from the inner walls of respective bores, 31 and 41; accordingly, the reflection at the side of the glass member 13 may be reduced at regions close to the end 13d. Moreover, even when the external fiber 25 is wiggled as the sleeve 117 receives the ferrule 23, the coupling fluctuation or the coupling loss may be reduced because the glass member 13 has the diameter substantially equal to that of the optical fiber 25 and has substantially homogeneous distribution in the refractive index thereof, namely, the glass member 13 has no boundary to distinguish the core region from the cladding region like the ordinary optical fiber applied in the conventional optical receptacle.

FIG. 10C compares the tolerance curve for the miss-alignment between the ferrule 23 and the glass member 13 of the present invention. FIG. 10A schematically illustrates the optical arrangement of the members according to the present invention; while, the conventional arrangement is schematically illustrated in FIG. 10B. In the arrangement according to the present embodiment shown in FIG. 10A, the light emitted from the LD 44 in the optical device 39 optically couples with the glass member 13 at the end surface 13d thereof through the lens 53. In this arrangement, the focal point F of the lens 53 positions in front of the end surface 13d of the glass member 13 by a distance $L_D$, that is, the light from the LD 44 is de-focused to get the predetermined optical power from the end of the glass member 13. The de-focusing of the light from the LD 44 may adjust the maximum optical power obtainable from the other end of the glass member 13.

The conventional optical sub-assembly installs, instead of the glass member 13 of the present invention, the stub 12 with the coupling fiber 14 in a center portion thereof The light emitted from the LD 44 may optically couple with the end surface of the stub 12. FIG. 10C shows two behaviors, $C_A$ and $C_B$, of the coupling tolerance for two optical sub-assemblies along the direction X. The behavior $C_A$ corresponds to the TOSA according to the present embodiment, while, the behavior $C_B$ indicates the result for the conventional arrangement. The TOSA according to the present invention greatly improves the coupling tolerance as clearly shown in FIG. 10C. The misalignment of about 2.0 μm in a maximum between the ferrule 23 and the coupling fiber 14 or the glass member 13 inevitably accompanies at the insertion/extraction of the ferrule. The coupling loss exceeds 1.0 dB for the conventional arrangement of FIG. 10B; while, the receptacle of the present invention of FIG. 10A shows the coupling loss smaller than 0.5 dB. Moreover, when we apply a force to the external fiber after the ferrule 23 is set in the sleeve, that is, after the optical connector with the ferrule 23 mates with the optical receptacle, misalignment greater than 2.5 μm may occur, which is called wiggle failure. Even for such a wiggle failure, the arrangement of the present invention shows a coupling loss about 0.5 dB while the conventional arrangement exceeds 2.0 dB.

Figure 11:
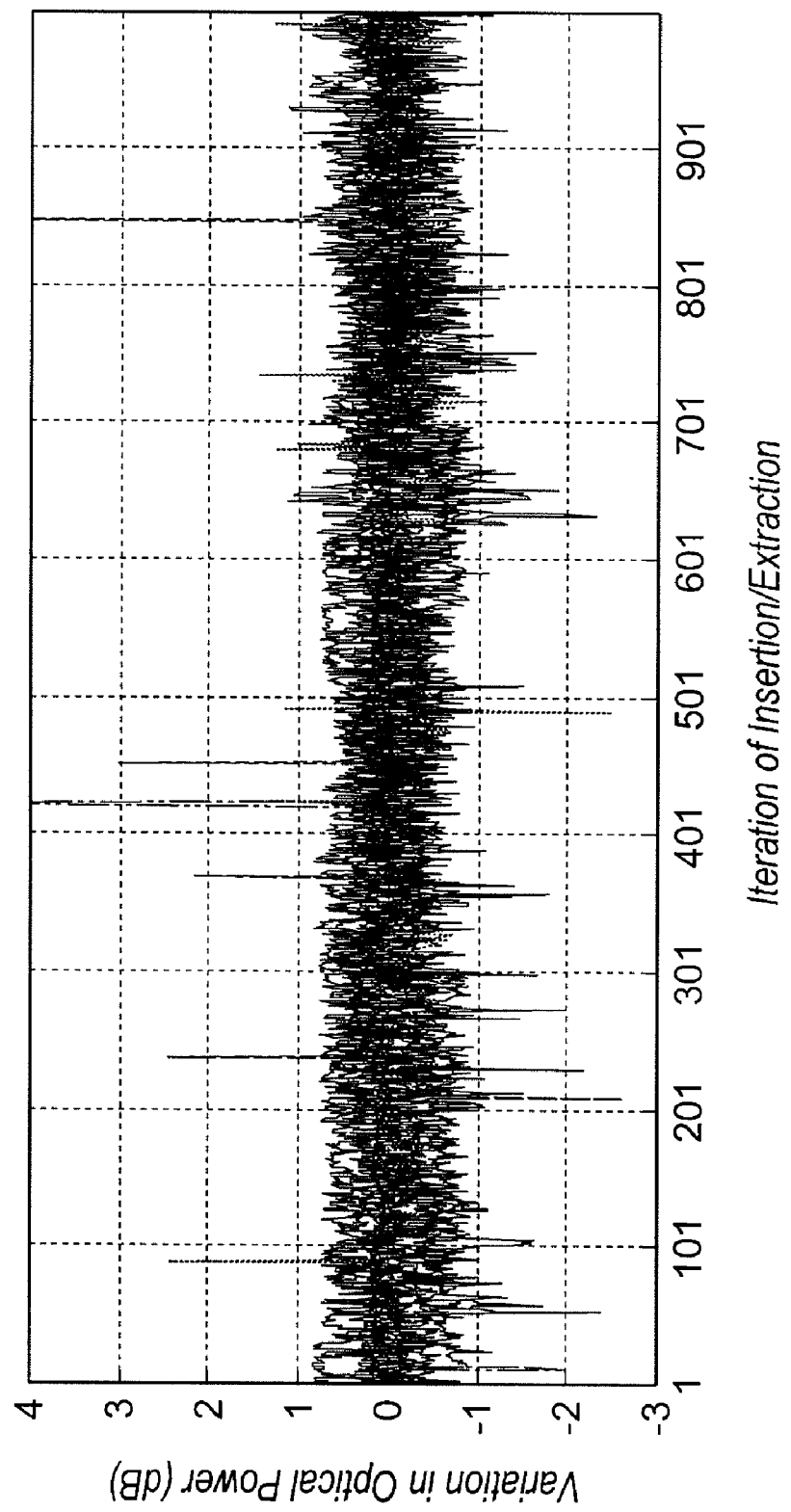
FIG. 11 shows an experimental result of the fluctuation of the optical coupling efficiency obtained in the conventional optical receptacle.
Figure 12:
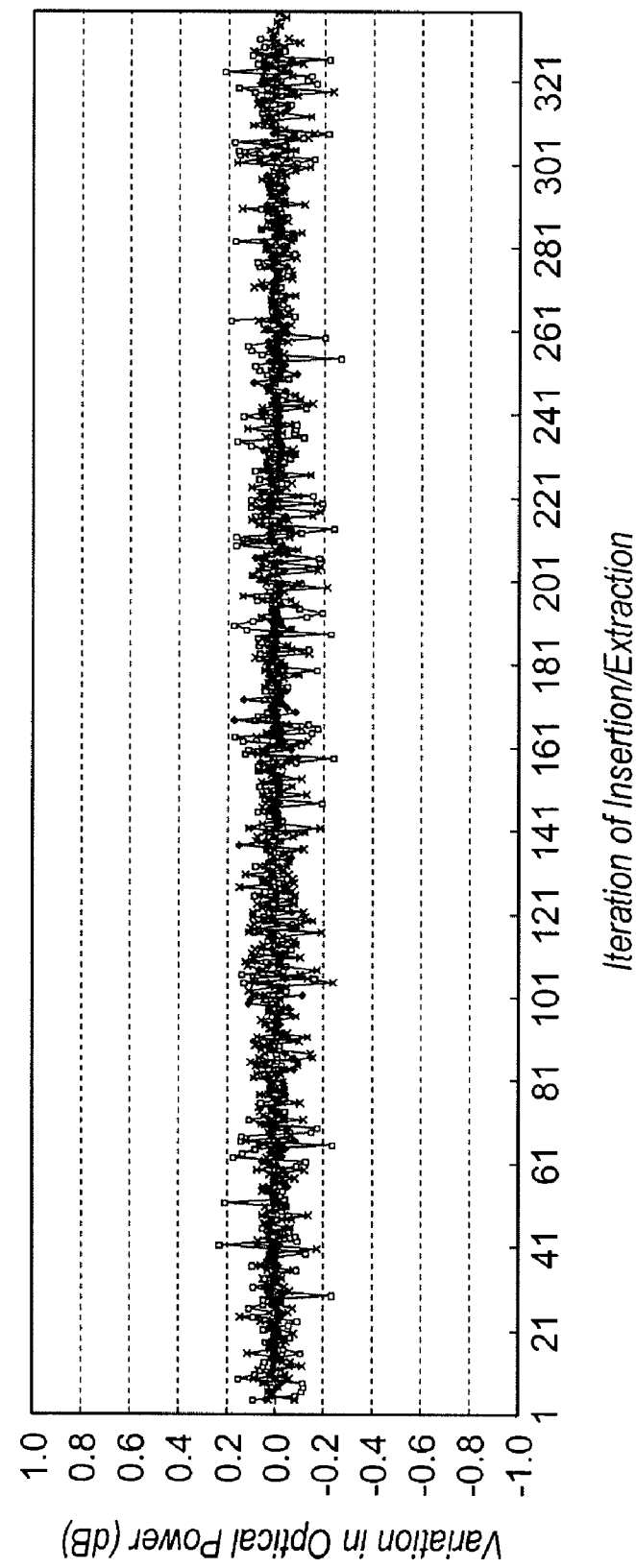
FIG. 12 shows an experimental result of the fluctuation of the optical coupling efficiency obtained in the optical receptacle according to the present invention.

FIGS. 11 and 12 show experimental results of the optical coupling characteristic for the optical receptacles according to the present invention, FIG. 12, and that of the conventional receptacle, FIG. 11. In FIG. 11, twelve (12) optical receptacles were evaluated; while, four (4) optical receptacles were tested in FIG. 12. The horizontal axis in both diagrams corresponds to the iteration count of insertion/extraction of the ferrule; while, the vertical axis denotes the fluctuation of the optical power, which is measured from the average optical power. In FIG. 11, the variation in optical power becomes within 1 dB on average but the variation suddenly exceeds 2 dB or more. On the other hand, the arrangement of the optical receptacle of the invention, as clearly illustrated in FIG. 12, shows the variation less than 0.2 dB on average and no sudden increase. Thus, the glass member 13 provided in the optical receptacle according to the present invention may reduce the fluctuation of the optical power caused by the misalignment between the ferrule and the optical receptacle at the insertion/extraction of the ferrule and by the wiggle of the external fiber.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

We claim:

1. An optical sub-assembly optically coupleable with an external fiber that provides a ferrule in an end of said external fiber, comprising:
   an optical receptacle including
   a glass member having a substantially homogeneous distribution of refractive index and a diameter substantially equal to a diameter of said external fiber, said glass member coming in physical contact with said external fiber;

a holder having a first bore, a second bore connected to said first bore, and a third bore, said first bore having a diameter slightly larger than a diameter of said glass member to hold said glass member, a sleeve arranged to receive said ferrule in one side thereof and said holder in another side thereof, and a shell including a support portion and a joint portion, said support portion holding said holder with said glass member and said sleeve; and an optical device that installs a semiconductor optical device, said optical device being held by said joint portion of said shell, wherein said second bore of said holder has a diameter greater than said diameter of said first bore to form a gap between said glass member and an inner wall of said second bore, wherein said third bore of said holder has a diameter greater than said diameter of said second bore, and wherein said glass member has an end surface facing said optical device positioned in said third bore.

2. The optical sub-assembly of claim 1, wherein said holder provides a first portion and a second portion, said first portion holding said glass member, and wherein said support portion of said shell provides a first bore into which said second portion of said holder is press-fitted as said first portion of said holder protrudes from said first bore of said support portion to be press-fitted into said sleeve.

3. The optical sub-assembly of claim 2, wherein said support portion further provides a second bore connected to said first bore of said support portion so as to form a step therebetween, and wherein said holder is press-fitted in said second portion thereof into said first bore of said support portion so as to abut an end of said holder facing said optical device against said step between said first and second bores of said support portion.

4. The optical sub-assembly of claim 1, wherein said holder has a first portion and a second portion, said first portion holding said glass member, wherein said support portion of said shell provides a first bore into which said second portion of said holder is press-fitted as said first portion of said holder protrudes from said first bore of said support portion to be press-fitted into said sleeve.

5. The optical sub-assembly of claim 4, wherein said support portion of said shell further provides a second bore connected to said first bore of said support portion so as to form a step therebetween, and wherein said holder is press-fitted in said second portion thereof into said first bore of said support portion so as to abut an end of said holder facing said optical device against said step between said first and second bores of said support portion.

6. The optical sub-assembly of claim 1, wherein said glass member is held by said holder with resin.

7. The optical sub-assembly of claim 1, wherein said glass member is made of silica glass.

8. The optical sub-assembly of claim 1, wherein said holder is made of one of ceramics, metal or resin.

9. An optical receptacle arranged to receive an optical ferrule with an optical fiber in a center of said ferrule and to couple said optical fiber with an optical device assembled with said optical receptacle, said optical receptacle comprising:

a glass member having a substantially homogeneous distribution of refractive index and a diameter substantially equal to a diameter of said optical fiber, said glass member coming in physical contact with said optical fiber;

a holder having a first bore, a second bore connected to said first bore, and a third bore, said first bore having a diameter slightly larger than a diameter of said glass member to hold said glass member, a sleeve arranged to receive said ferrule in a side and said holder in another side thereof, and a support member arranged to hold said sleeve and said holder, said support member providing a bore into which said another side of said sleeve is press-fitted, wherein said second bore of said holder has a diameter greater than said diameter of said first bore to form a gap between said glass member and an inner wall of said second bore, wherein said third bore has a diameter greater than said diameter of said second bore, and wherein said glass member has an end surface facing said optical device positioned in said third bore.

10. The optical receptacle of claim 9 wherein said holder provides a first portion and a second portion, said first portion holding said glass member, and wherein said support member provides another bore into which said second portion of said holder is press-fitted as said first portion of said holder protrudes from said another bore of said support member to be received by said another side of said sleeve.

11. The optical receptacle of claim 10, further comprising a joint member assembled with said support member, wherein said joint member provides an opening connected to said another bore of said support member, said opening having a diameter smaller than a diameter of said another bore of said support member to expose an end surface of said joint member, and wherein said second portion of said holder is press-fitted into said another bore of said support member so as to abut an end of said holder facing said joint member against said end surface of said joint member.

12. The optical receptacle of claim 9, wherein said holder has a first portion and a second portion, said first portion holding said glass member, wherein said support member provides another bore into which said second portion of said holder is press-fitted as said first portion of said holder protrudes from said another bore to be received by said another side of said sleeve.

13. The optical receptacle of claim 12, further comprising a joint member assembled with said support member, said joint member providing an opening connected to said another bore of said support member, said opening having a diameter smaller than a diameter of said another bore of said support member to expose an end surface of said joint member, and wherein said second portion of said holder is press-fitted into said another bore of said support member so as to abut an end of said holder facing said joint member against said end surface of said joint member.

14. The optical receptacle of claim 9, wherein said another side of said sleeve forms a gap to said holder.

15. The optical receptacle of claim 9,
wherein said glass member is made of silica glass.

16. The optical receptacle of claim 9,
wherein said holder is made of one of ceramics, metal or resin.

17. The optical receptacle of claim 9,
wherein said glass member is held by said holder with resin.

* * * * *